US008727360B2

(12) United States Patent
Catford

(10) Patent No.: US 8,727,360 B2
(45) Date of Patent: May 20, 2014

(54) DROP DECK TRAILER

(76) Inventor: David Catford, Gladstone (AU)

(*) Notice: Subject to any disclaimer, the term of this patent is extended or adjusted under 35 U.S.C. 154(b) by 71 days.

(21) Appl. No.: 13/496,632

(22) PCT Filed: Sep. 16, 2010

(86) PCT No.: PCT/AU2010/001206
§ 371 (c)(1),
(2), (4) Date: Mar. 16, 2012

(87) PCT Pub. No.: WO2011/032216
PCT Pub. Date: Mar. 24, 2011

(65) Prior Publication Data
US 2012/0181760 A1 Jul. 19, 2012

(30) Foreign Application Priority Data
Sep. 16, 2009 (AU) .................................. 2009904488

(51) Int. Cl.
*B60P 1/02* (2006.01)

(52) U.S. Cl.
CPC ............. *B60P 1/027* (2013.01); *B60G 2300/38* (2013.01)
USPC ..................................................... 280/43.18

(58) Field of Classification Search
CPC .. B60G 5/00; B60G 2300/04; B60G 2300/38; B60P 1/027; B60P 1/025
USPC ............. 280/43.18, 6.153, 490.1, 491.3, 484, 280/43.17; 414/495
See application file for complete search history.

(56) References Cited

U.S. PATENT DOCUMENTS

| 2,199,392 | A | * | 5/1940 | Dabrasky | 267/249 |
|---|---|---|---|---|---|
| 2,681,811 | A | | 6/1954 | Green | |
| 2,905,481 | A | * | 9/1959 | Schramm | 280/43.18 |
| 3,240,506 | A | * | 3/1966 | McMullen | 280/43.23 |
| 3,361,440 | A | * | 1/1968 | Green | 280/43.18 |
| 3,574,388 | A | * | 4/1971 | Stone | 296/168 |
| 3,784,218 | A | * | 1/1974 | Stone | 280/43.23 |
| 4,008,902 | A | * | 2/1977 | Dill | 280/43.23 |
| 5,433,578 | A | * | 7/1995 | Honan | 414/476 |
| 5,476,274 | A | * | 12/1995 | Oberlander | 280/43.17 |
| 5,915,705 | A | * | 6/1999 | VanDenberg | 280/43.23 |
| 6,003,888 | A | * | 12/1999 | Godbersen | 280/124.169 |
| 6,273,435 | B1 | * | 8/2001 | Stringer | 280/6.151 |
| 7,735,839 | B1 | * | 6/2010 | Schlangen | 280/6.151 |
| 7,950,675 | B1 | * | 5/2011 | Quenzi et al. | 280/6.157 |
| 8,172,248 | B2 | * | 5/2012 | Groves | 280/414.5 |
| 2006/0045693 | A1 | * | 3/2006 | Elliot et al. | 414/481 |
| 2010/0258325 | A1 | * | 10/2010 | Palen | 172/423 |
| 2010/0289250 | A1 | * | 11/2010 | Fankhauser et al. | 280/490.1 |

FOREIGN PATENT DOCUMENTS

AU          2001 76109 A1     4/2002
WO     WO 2007/145537 A1    12/2007

OTHER PUBLICATIONS

International Search Report and Written Opinion for International Application No. PCT/AU2010/001206, dated Nov. 8, 2010.

* cited by examiner

*Primary Examiner* — Katy M Ebner
*Assistant Examiner* — Brian Cassidy
(74) *Attorney, Agent, or Firm* — Alston & Bird LLP

(57) ABSTRACT

This invention relates to a trailer comprising a body, a wheel assembly on each side of and floating relative to the trailer body, a linear actuator driving means adapted to selectively raise and lower body relative to its wheel assemblies while keeping the body substantially parallel to the ground throughout its range of movement and providing a mechanical advantage to the actuator.

11 Claims, 17 Drawing Sheets

DROP DECK TRAILER

FIELD OF THE INVENTION

The present invention relates to a trailer for towing behind a powered vehicle; for the purpose of explanation, the invention will be described in relation to that class of trailers known as utility trailers, although the invention need not be so limited.

PRIORITY

This patent application claims priority from:
Australian Provisional Patent Application 2009904488, titled "DROP DECK TRAILER", and filed on 16 Sep. 2009.

The entire content of this application is hereby incorporated by reference.

BACKGROUND

Utility trailers are characterised by an open topped cargo area, and they are used for hauling light loads in much the same way that a ute or pickup truck is utilised.

The applicant is aware of certain utility trailers which are adapted to lower a body of the trailer to the ground for loading and unloading. An example of one such trailer is disclosed in Australian Patent Application No 200176109.

A problem common to these trailers is that they rely heavily upon the capacity and stroke of a hydraulic ram or rams to overcome rudimentary design.

It is an object of the present disclosure therefore provide a trailer that is an improvement over, or which is at least a useful alternative to, these known trailers.

Other objects and advantages of the present invention will become apparent from the following description, taking in connection with the accompanying drawings, wherein, by way of illustration and example, an embodiment of the present invention is disclosed.

In the specification and any claims, the terms "rearward(ly)", "rear", "front" and "forward(ly)" are used with reference to the normal direction of travel of the trailer under tow.

SUMMARY OF THE INVENTION

According to a first aspect of the invention, there is a trailer comprising a body, a drawbar pivotally connected to the body at a forward end thereof and comprising a pair of spaced apart uprights, one upright at or toward each of a pair of sides of the body, a linear actuator extending between the trailer body and a drawbar upright, a wheel assembly on each side of the trailer body, where for each wheel assembly there is a primary linkage extending between the drawbar upright and the wheel assembly of a same side of the trailer body, and a stabilizing linkage extending between the trailer body and the wheel assembly, and a linear actuator driving means operable to selectively raise and lower the body relative to its wheel assemblies whilst keeping the body substantially parallel to the ground throughout its range of movement.

In one form, the linear actuator driving means is operable to lower the body of the trailer to the surface upon which the trailer sits, and raise the body from this position.

In a further aspect, the invention may be said to reside in a trailer comprising a body, a wheel assembly on each side of and floating relative to the trailer body, a linear actuator driving means adapted to selectively raise and lower the body relative to its wheel assemblies whilst keeping the body substantially parallel to the ground throughout its range of movement and providing a mechanical advantage to the actuator.

In one form, the raise and lower means is adapted to lower the body of the trailer to the surface upon which the trailer sits.

In one form, the body defines a cargo area having a floor, and the raise and lower means is adapted to keep the floor of the body substantially parallel to the ground throughout its range of movement.

In one form, the body is lowered to the ground, the floor of the cargo area is contiguous with the ground surface.

In one form, the trailer comprises a trailer body, a drawbar pivotally connected to the body at a forward end thereof, a linear actuator extending between the trailer body and a portion of the drawbar, a wheel assembly to either side of the trailer body, a primary linkage extending between the drawbar and each wheel assembly, and a stabilising linkage extending between the trailer body and each wheel assembly.

In one form, each wheel assembly comprises a bogie, and a bogie arm to which the bogie, primary linkage and stabilising linkage are pivotally connected.

In one form, the wheel assembly comprises suspension.

In one form, the drawbar includes a pair of spaced apart uprights, one each at or toward either side of the trailer body.

In one form, there is a linear actuator at or toward either side of the trailer body, one each extending between a drawbar upright and a side of the trailer body.

In one form, there is a primary linkage at or toward either side of the trailer body, one each extending between a drawbar upright and a wheel assembly on either side of the trailer body.

In one form, the trailer body comprises a pair of spaced apart uprights at or toward a rear end thereof, one each at or toward either side of the trailer body.

In one form, there is a stabilising linkage at or toward either side of the trailer body, one each extending between a trailer body upright and a wheel assembly on either side of the trailer body.

In one form, the stabilising linkage comprises a pair of crossing linkages.

In one form, the bogie arm is driven to rotate in a forward direction to raise the trailer body relative to the wheel assemblies, and in a rearward direction to lower the trailer body relative to the wheel assemblies.

In one form, the trailer further comprises means for releasably securing the trailer body at a ride height relative to the wheel assemblies.

In a further aspect, the invention may be said to reside in a trailer comprising a trailer body, a drawbar pivotally connected to the body at a forward end thereof, a linear actuator extending between the trailer body and a portion of the drawbar, a wheel assembly to either side of and floating relative to the trailer body, a primary linkage extending between the drawbar and each wheel assembly, and a stabilising linkage extending between the trailer body and each wheel assembly, wherein in use the actuator effects raising and lowering of the body relative to its wheel assemblies.

In a further aspect, the invention may be said to reside in a trailer comprising a body, a drawbar pivotally connected to the body at a forward end thereof, a linear actuator extending between the trailer body and a portion of the drawbar, a wheel assembly on each side of and floating relative to the trailer body, the linear actuator driving means extending between the drawbar and the wheel assembly and adapted to selectively raise and lower the body relative to its wheel assemblies.

BRIEF DESCRIPTION OF THE DRAWINGS

For a better understanding of this disclosure it will now be described with respect to an exemplary embodiment which shall be described herein with the assistance of drawings wherein.

In the following description, like reference characters designate like or corresponding parts throughout the several views of the drawings.

DETAILED DESCRIPTION

Figure 1:
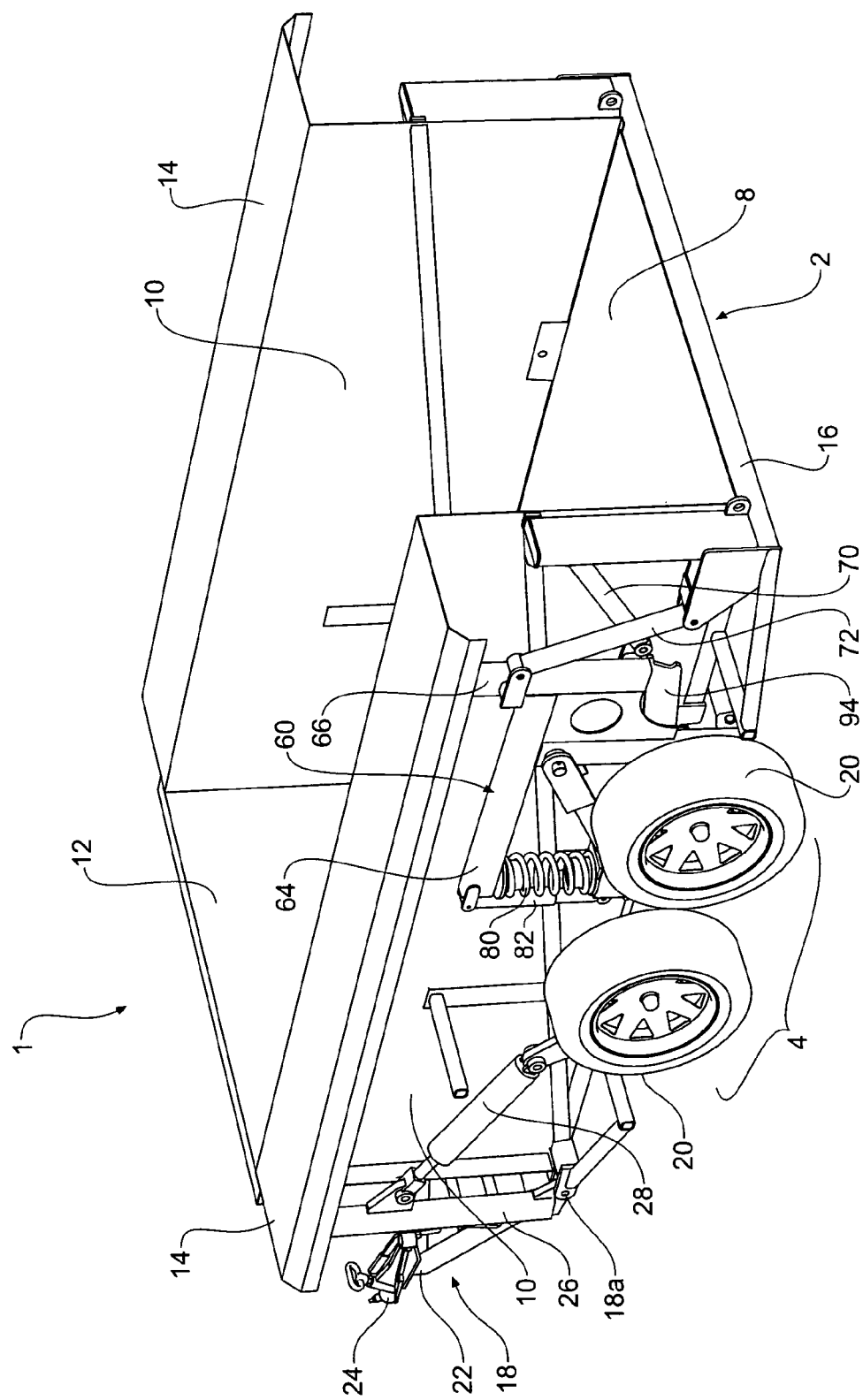
FIG. 1 is a perspective view of an exemplary trailer with its body supported at its ride height.
Figure 2:
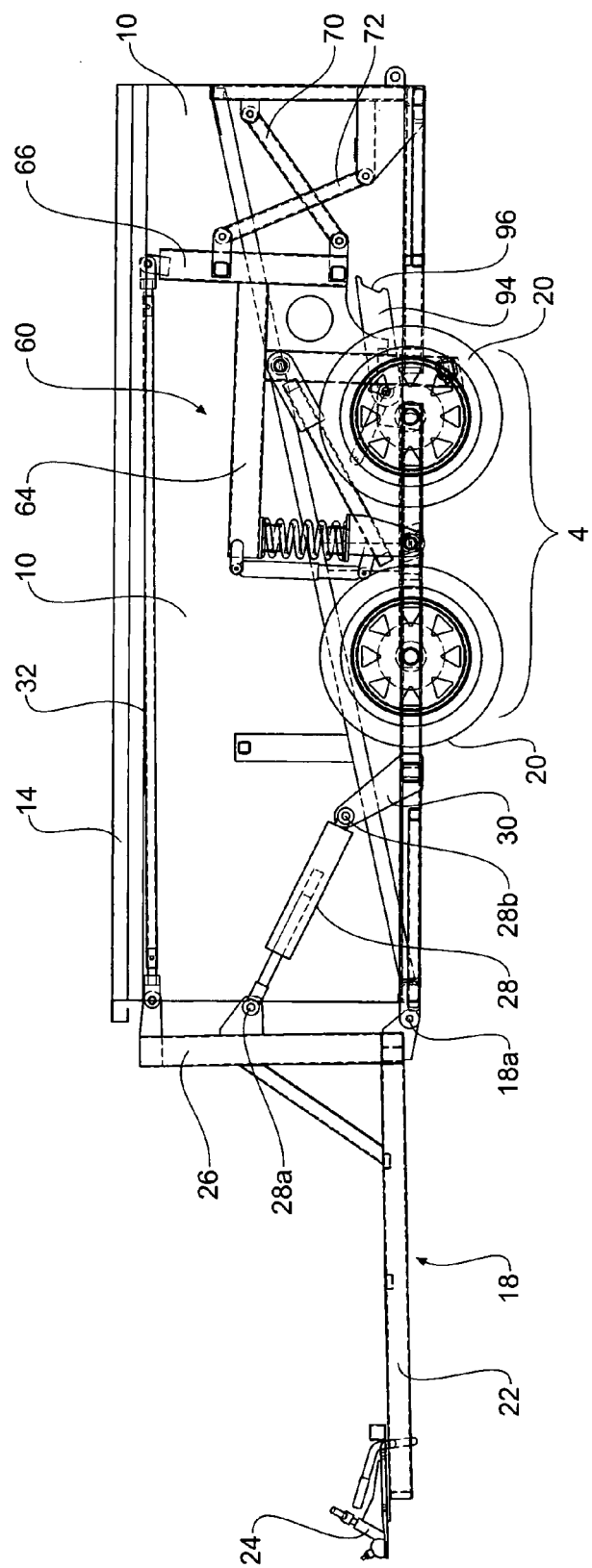
FIG. 2 is a side view of the trailer in FIG. 1, with its body supported at its ride height.
Figure 3:
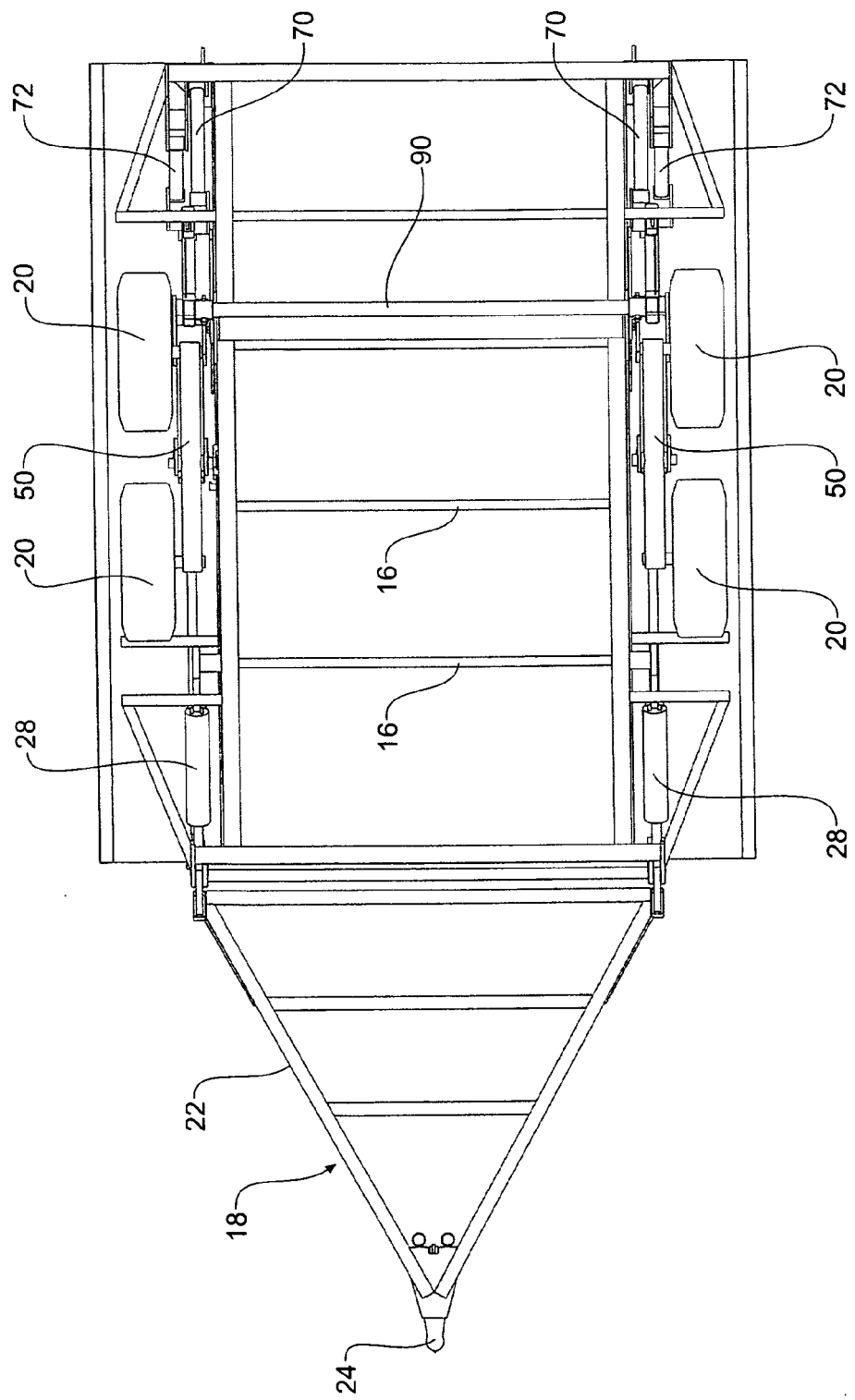
FIG. 3 is an underside view of the trailer in FIG. 1, with its body supported at its ride height.
Figure 4:
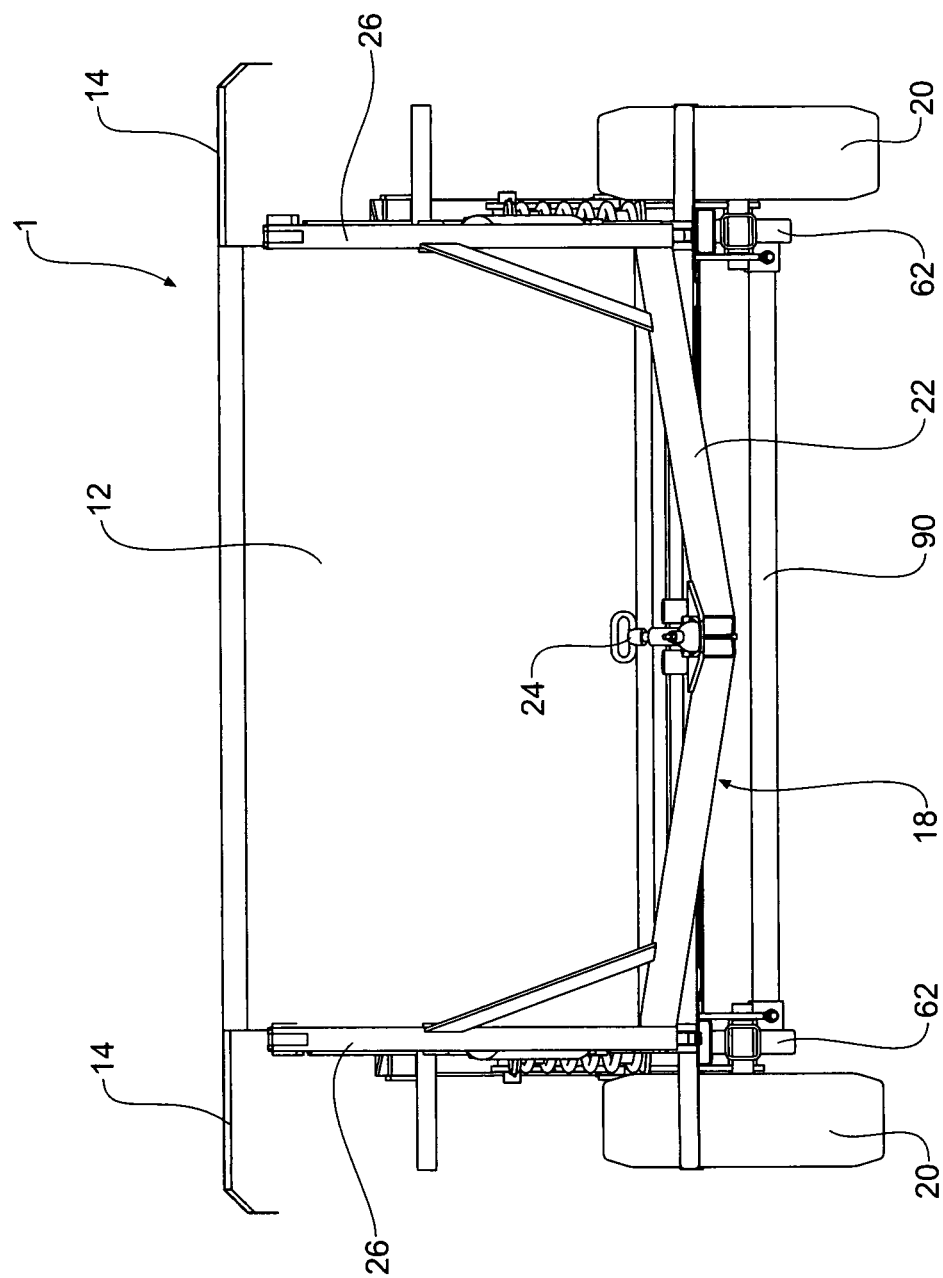
FIG. 4 is a front end view of the trailer in FIG. 1, with its body supported at its ride height.
Figure 5:
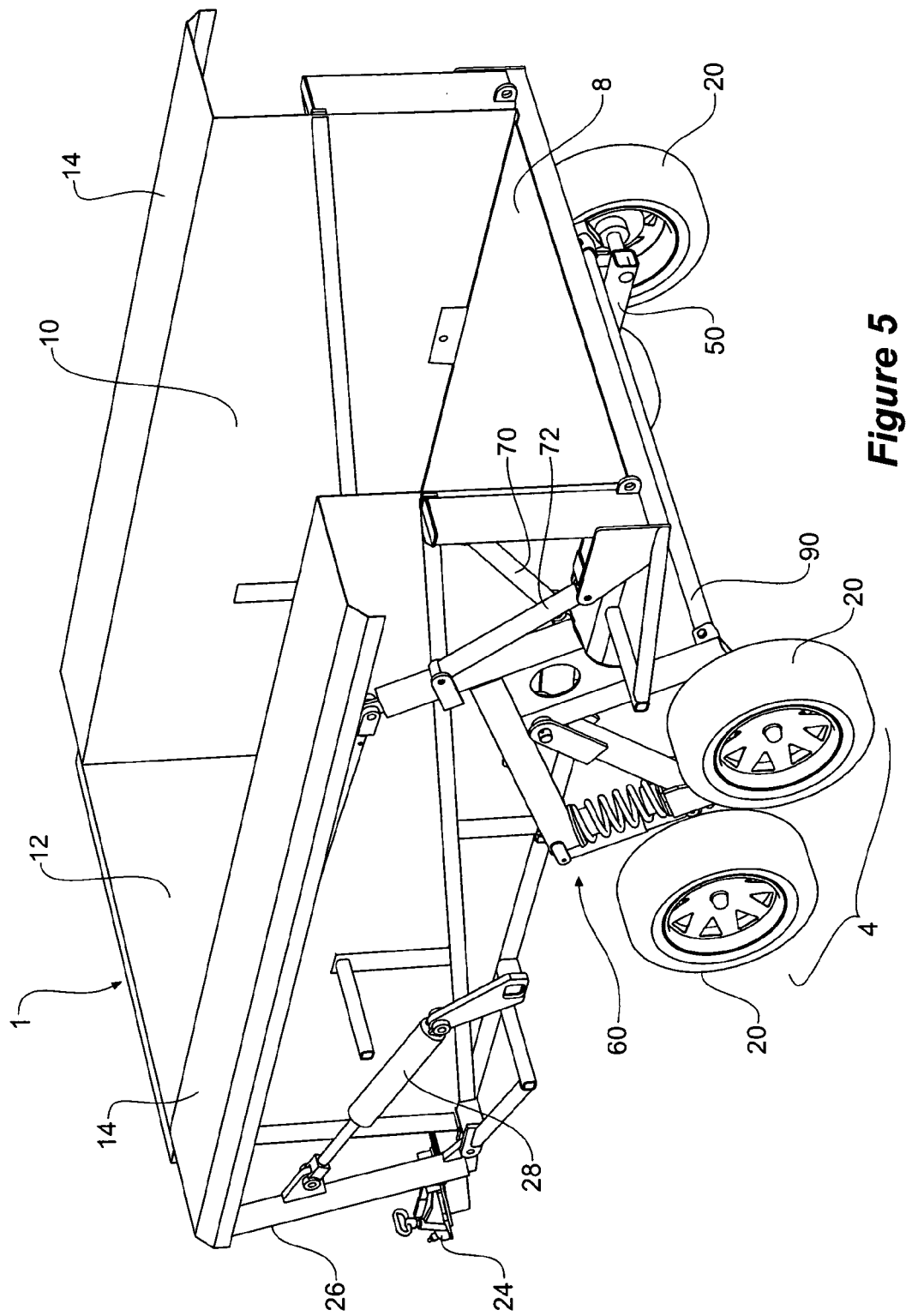
FIG. 5 is a perspective view of the trailer in FIG. 1, with its body raised above its ride height.
Figure 6:
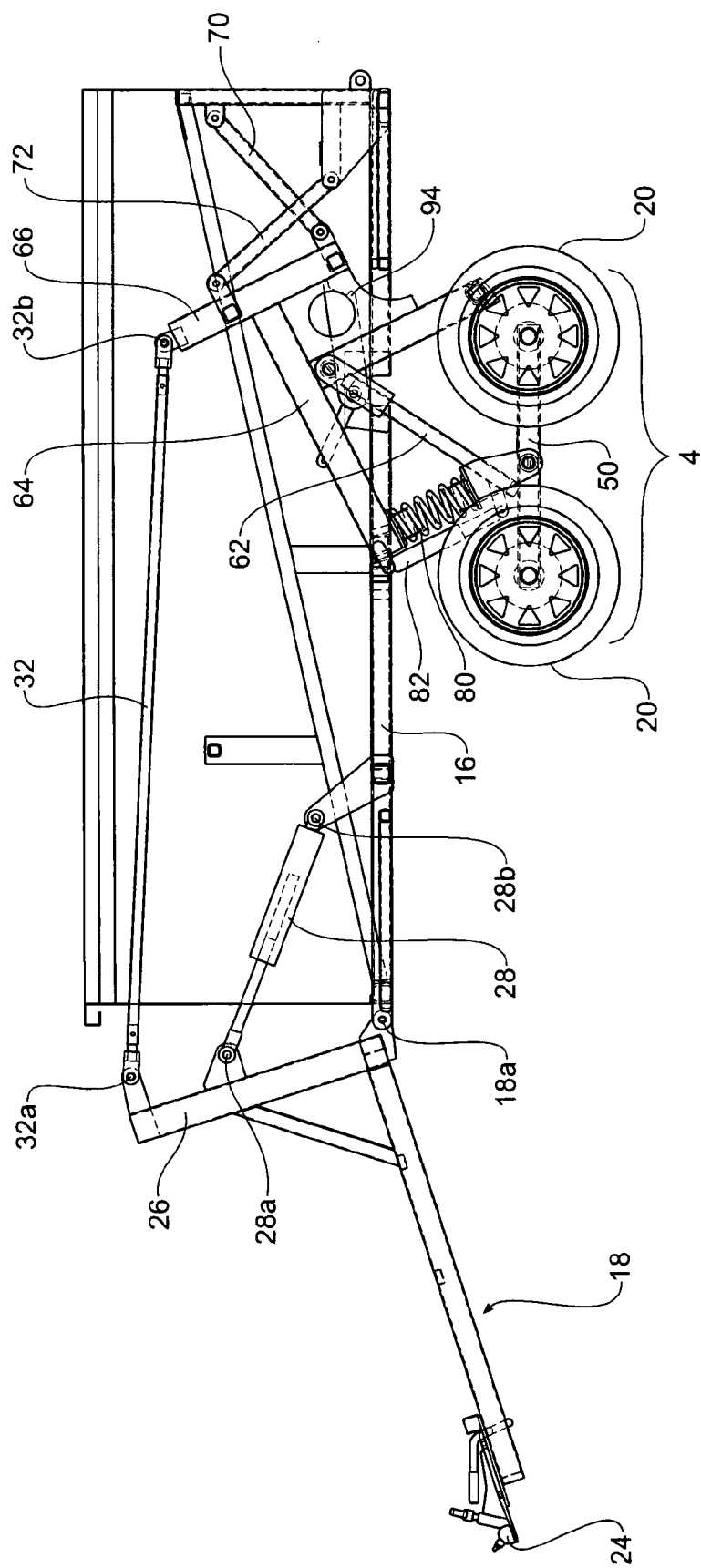
FIG. 6 is a side view of the trailer in FIG. 1, with its body raised above its ride height.
Figure 7:
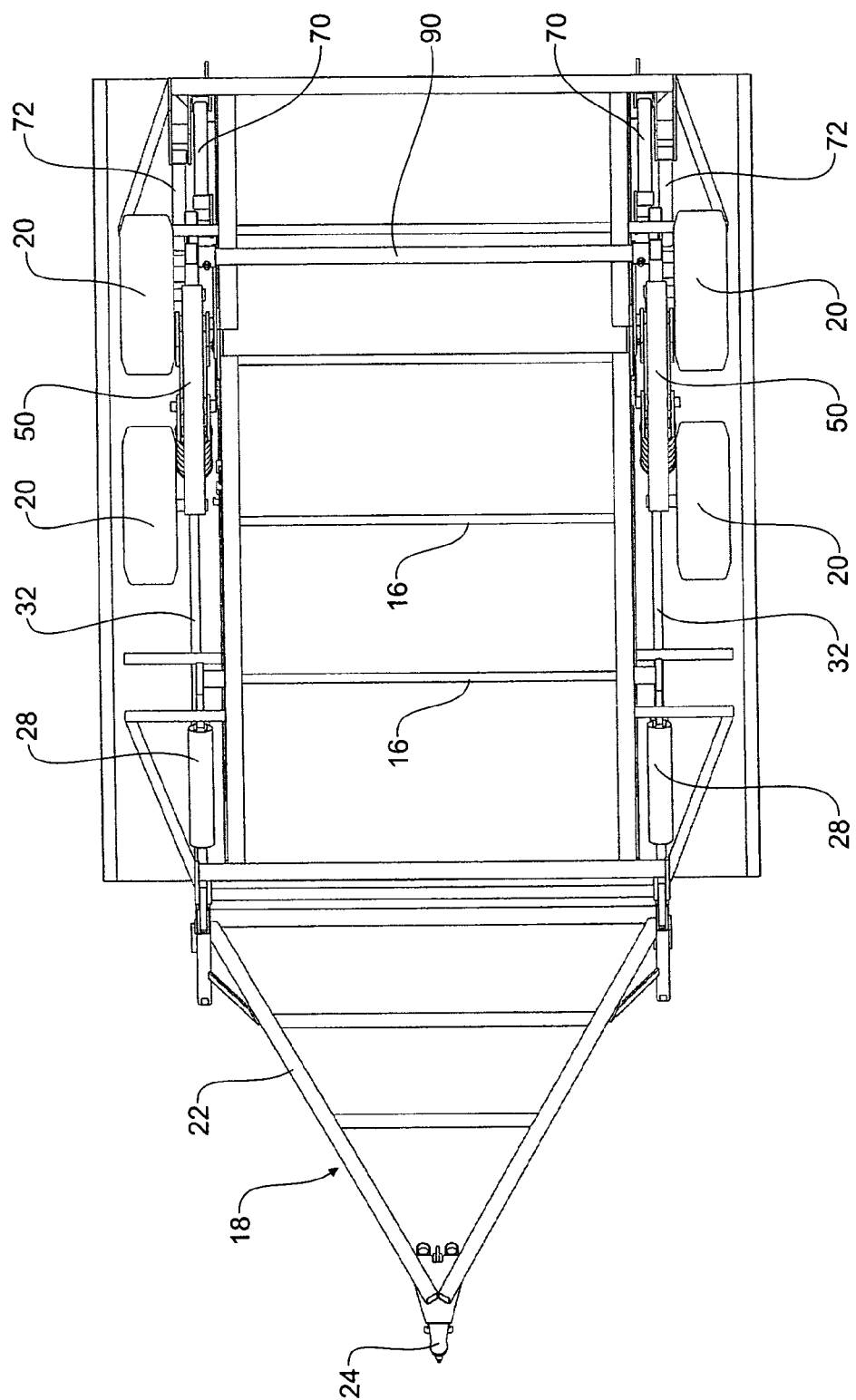
FIG. 7 is an underside view of the trailer in FIG. 1, with its body raised above its ride height.
Figure 8:
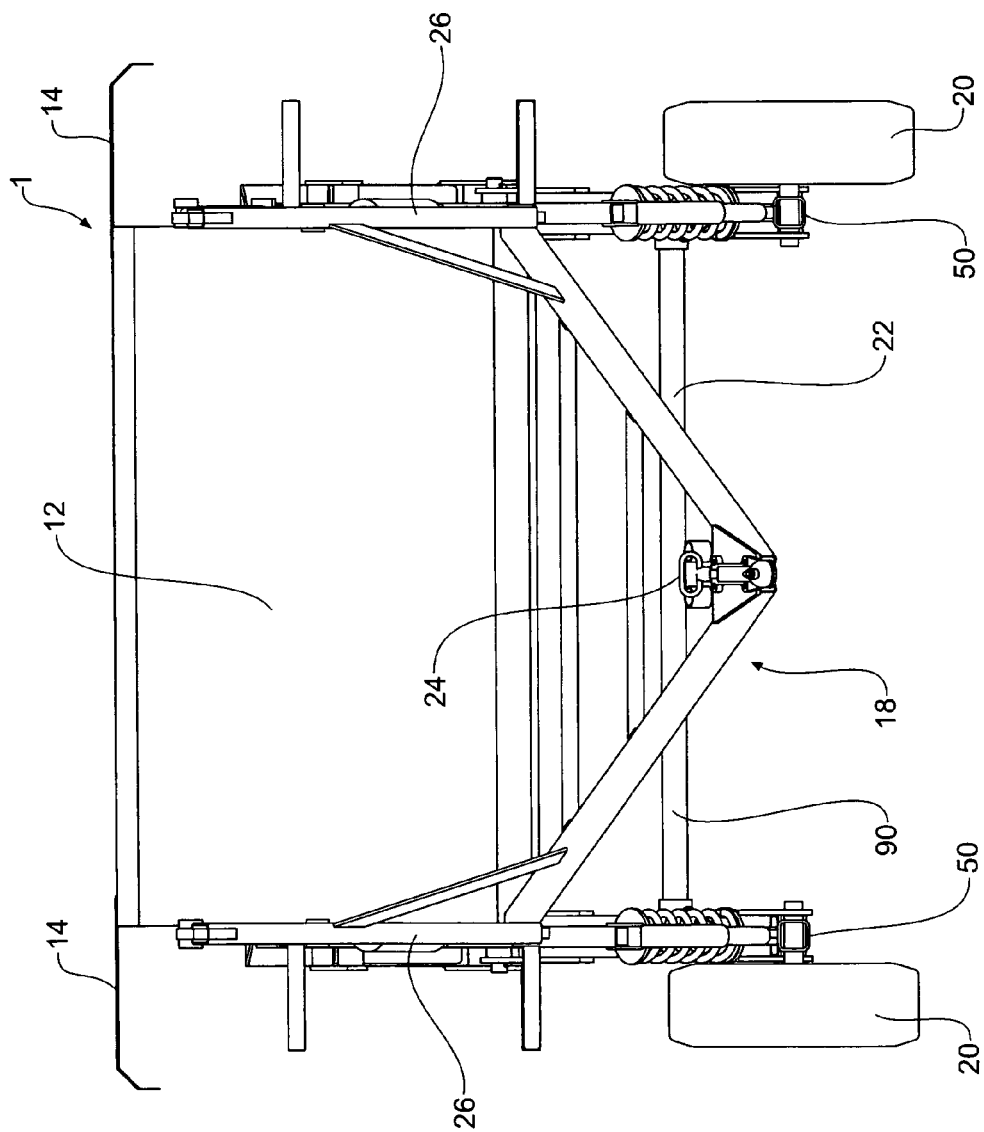
FIG. 8 is a front end view of the trailer in FIG. 1, with its body raised above its ride height.
Figure 9:
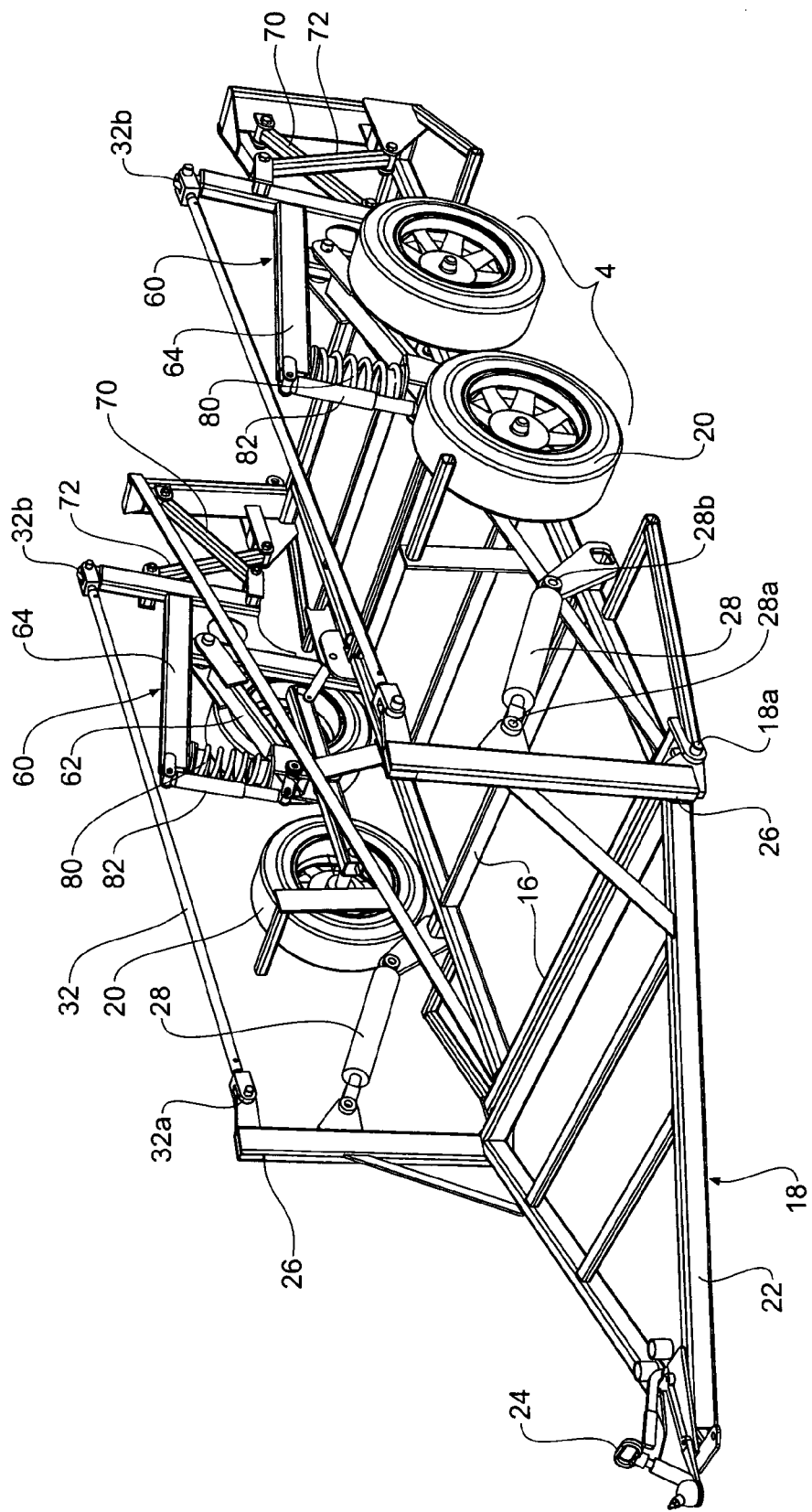
FIG. 9 is a forward perspective view of the trailer in FIG. 1, with its body lowered to the ground and the tray removed for visibility.
Figure 10:
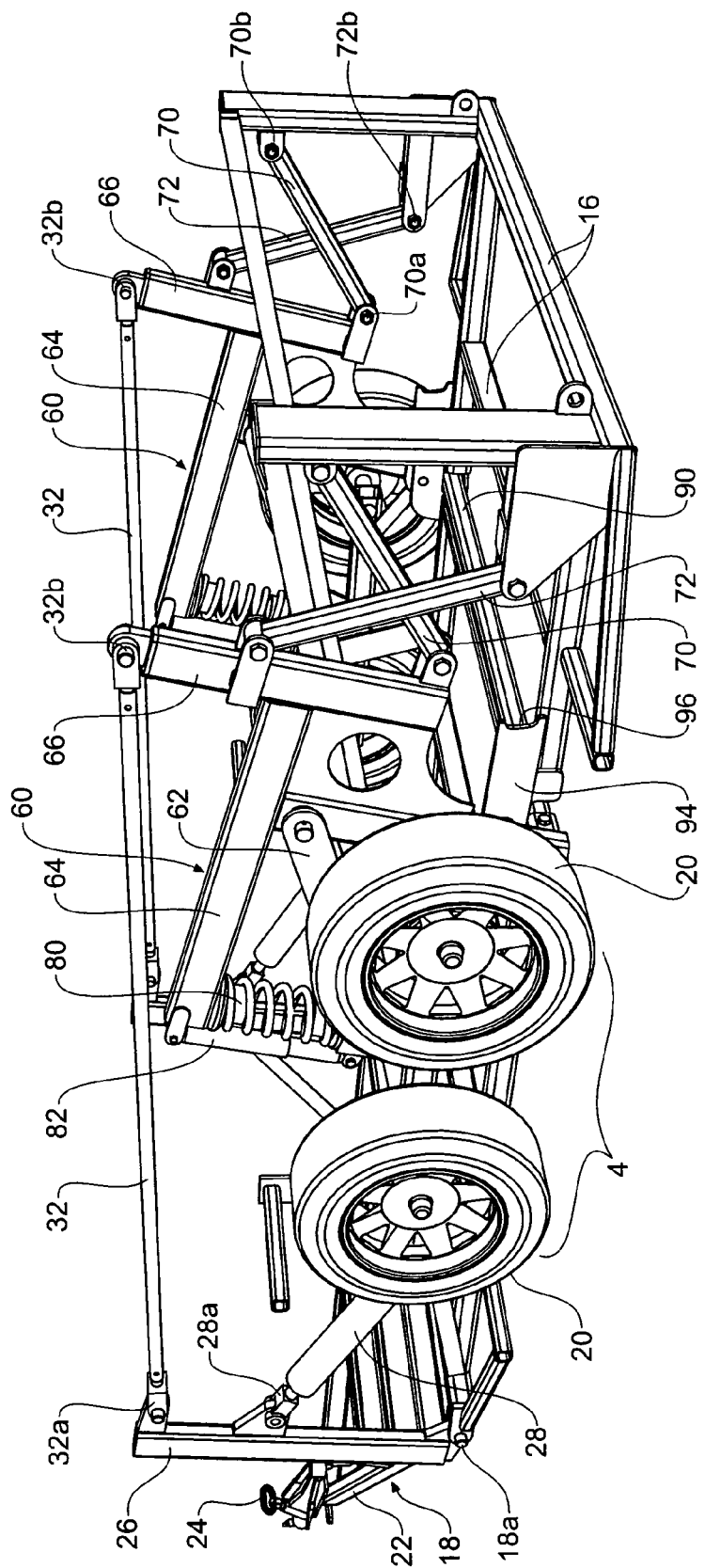
FIG. 10 is rearward perspective view of the trailer in FIG. 9, with its body lowered to the ground.
Figure 11:
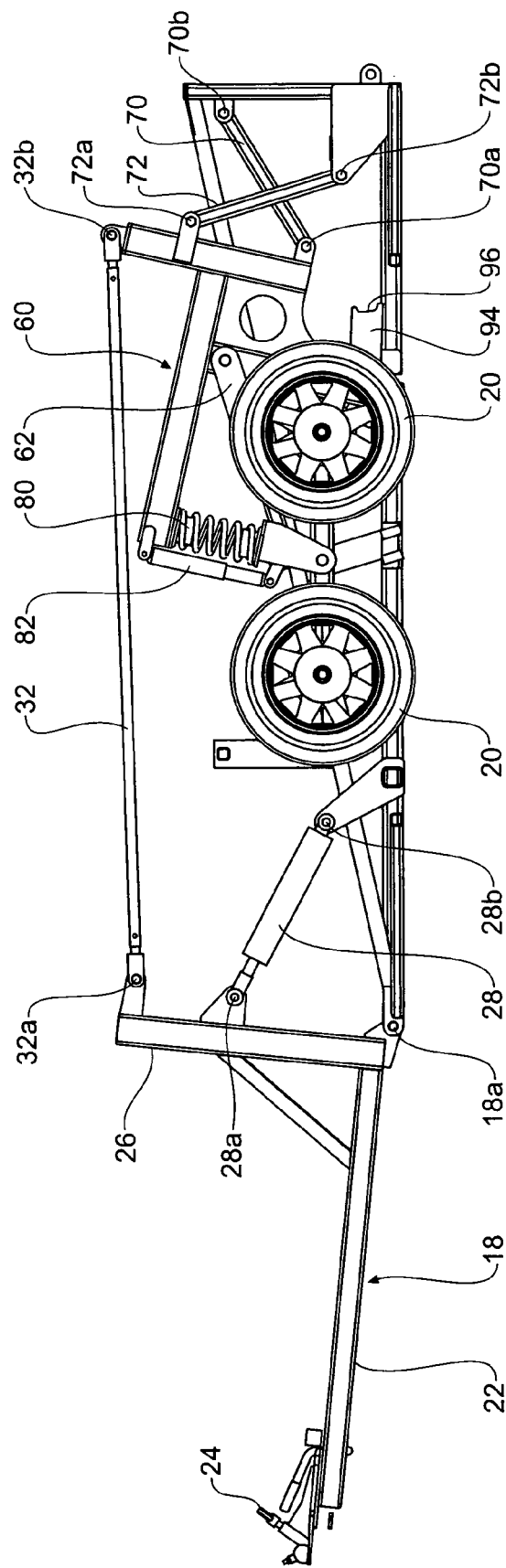
FIG. 11 is a side view of the trailer in FIG. 9, with its body lowered to the ground.
Figure 12:
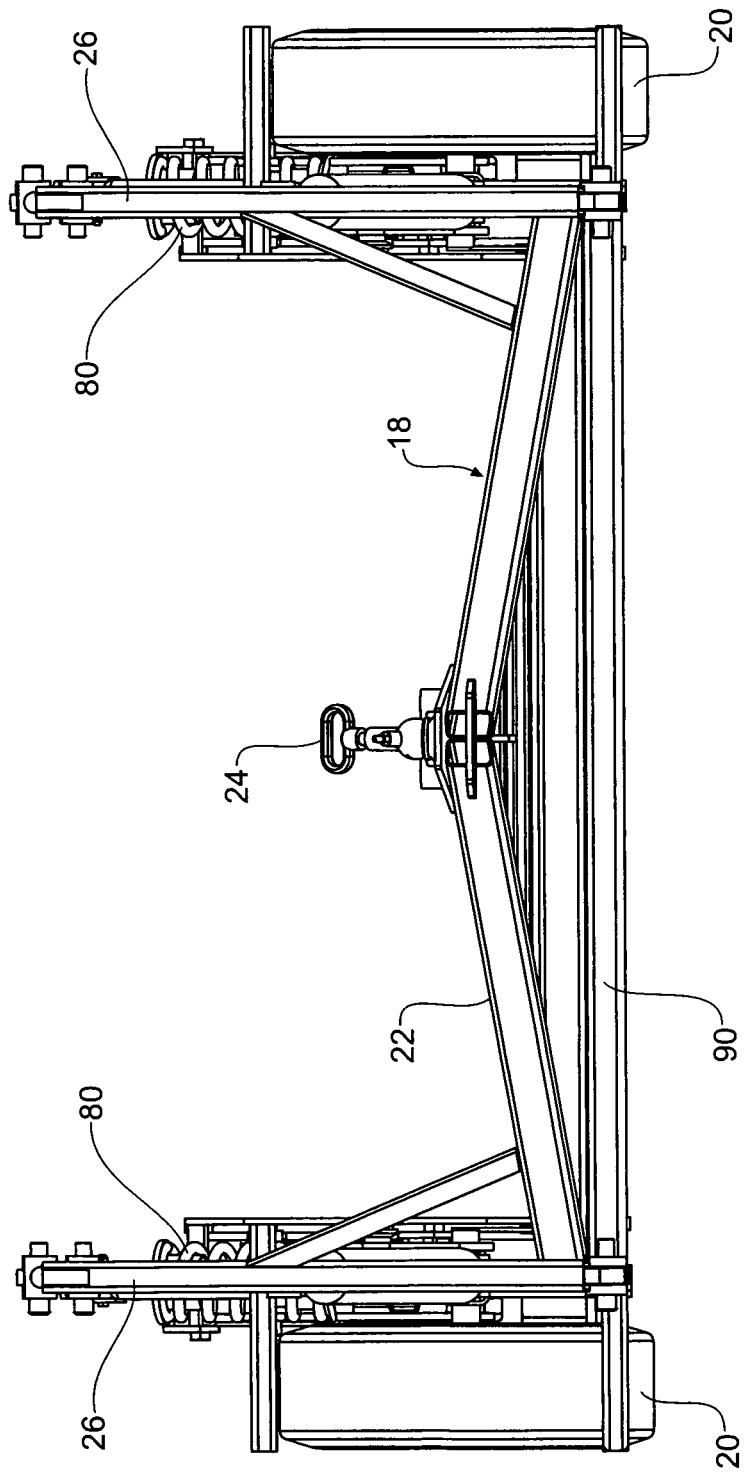
FIG. 12 is a front view of the trailer in FIG. 9, with its body lowered to the ground.
Figure 13:
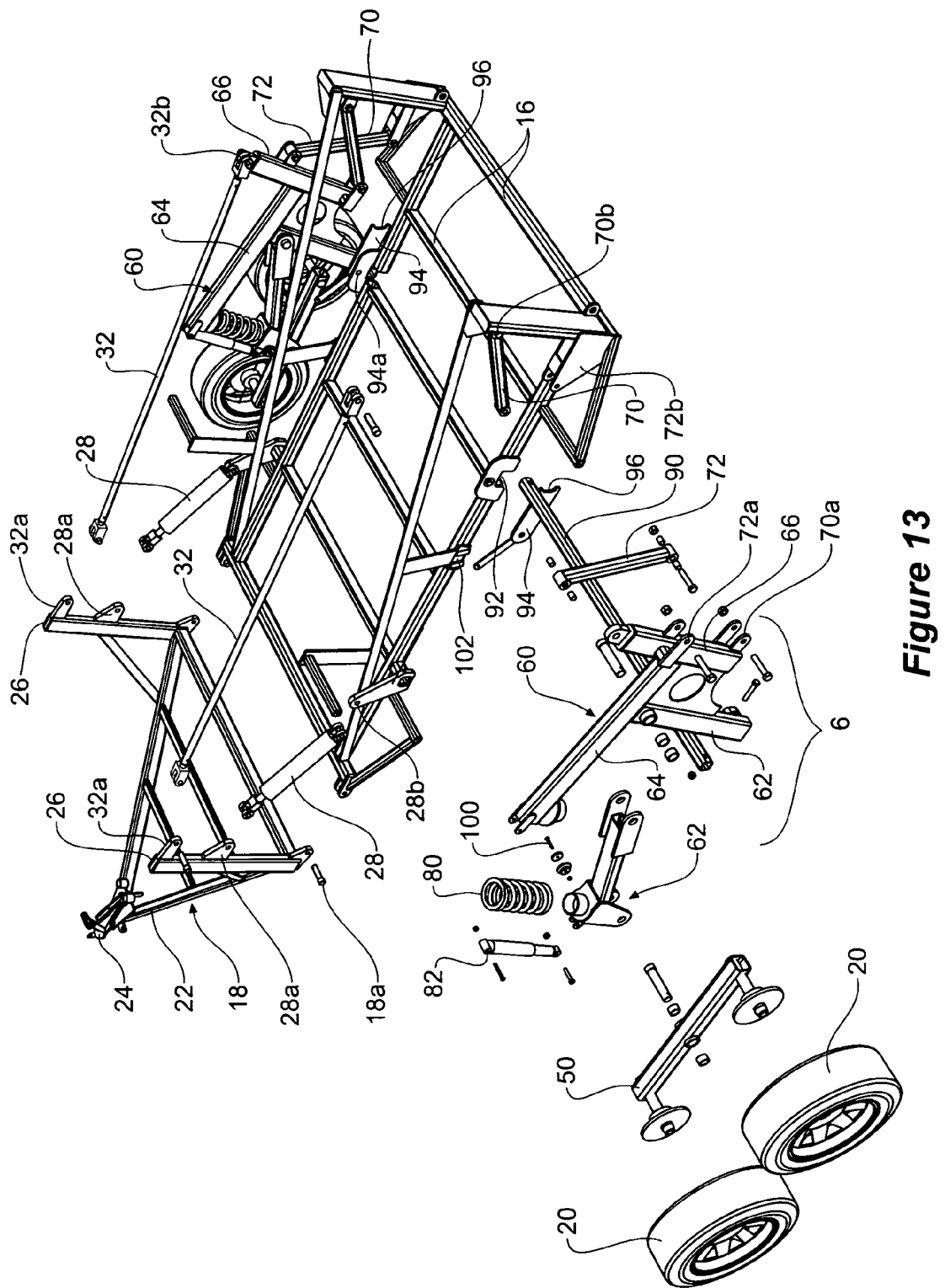
FIG. 13 is a perspective view of the trailer in FIG. 1, where one bogie and its associated raise and lower means have been illustrated with exploded detail.
Figure 14:
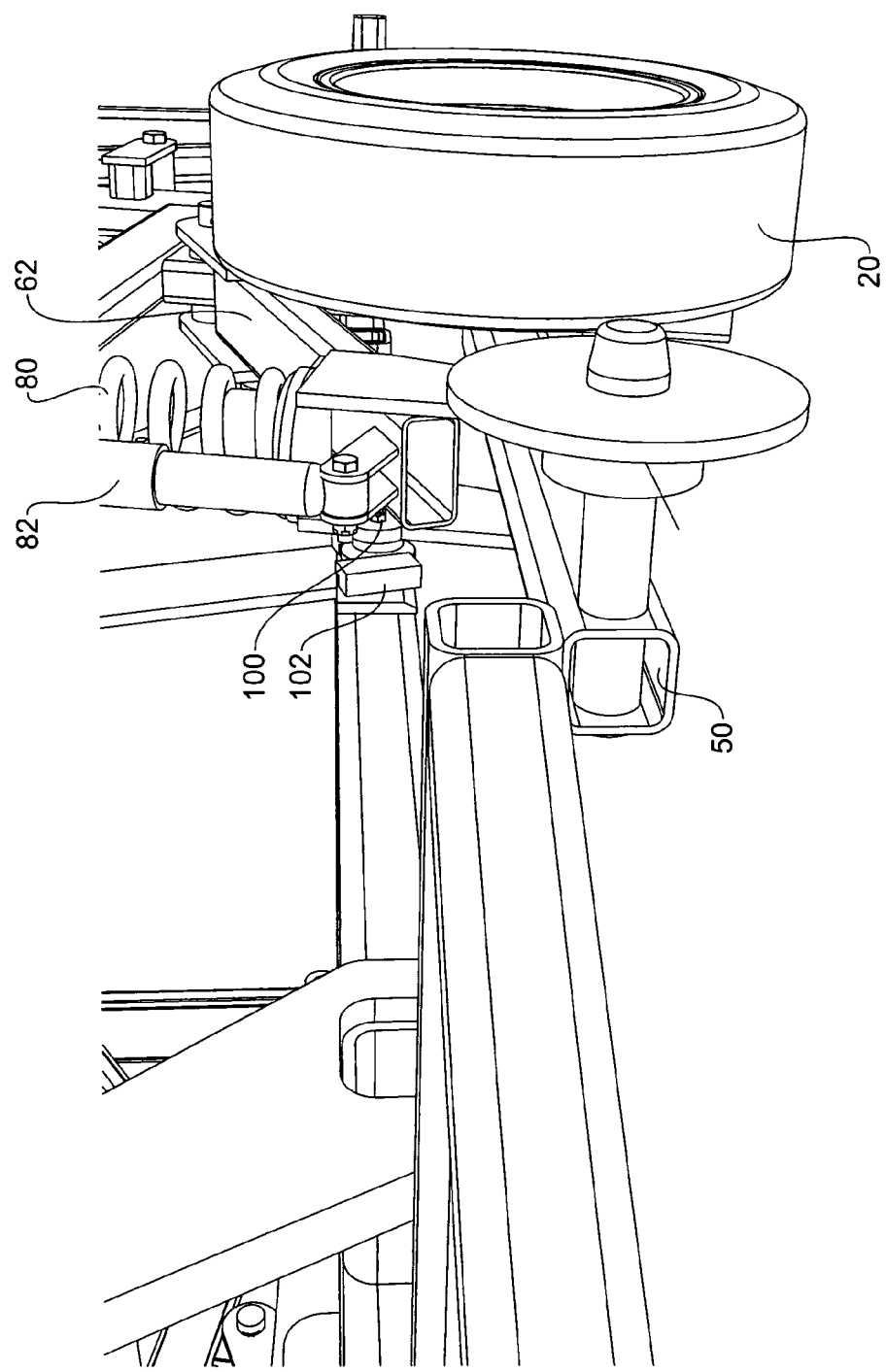
FIG. 14 is a detail view of one bogie and its associated raise and lower means at ride height, where one wheel has been removed for visibility.
Figure 15:
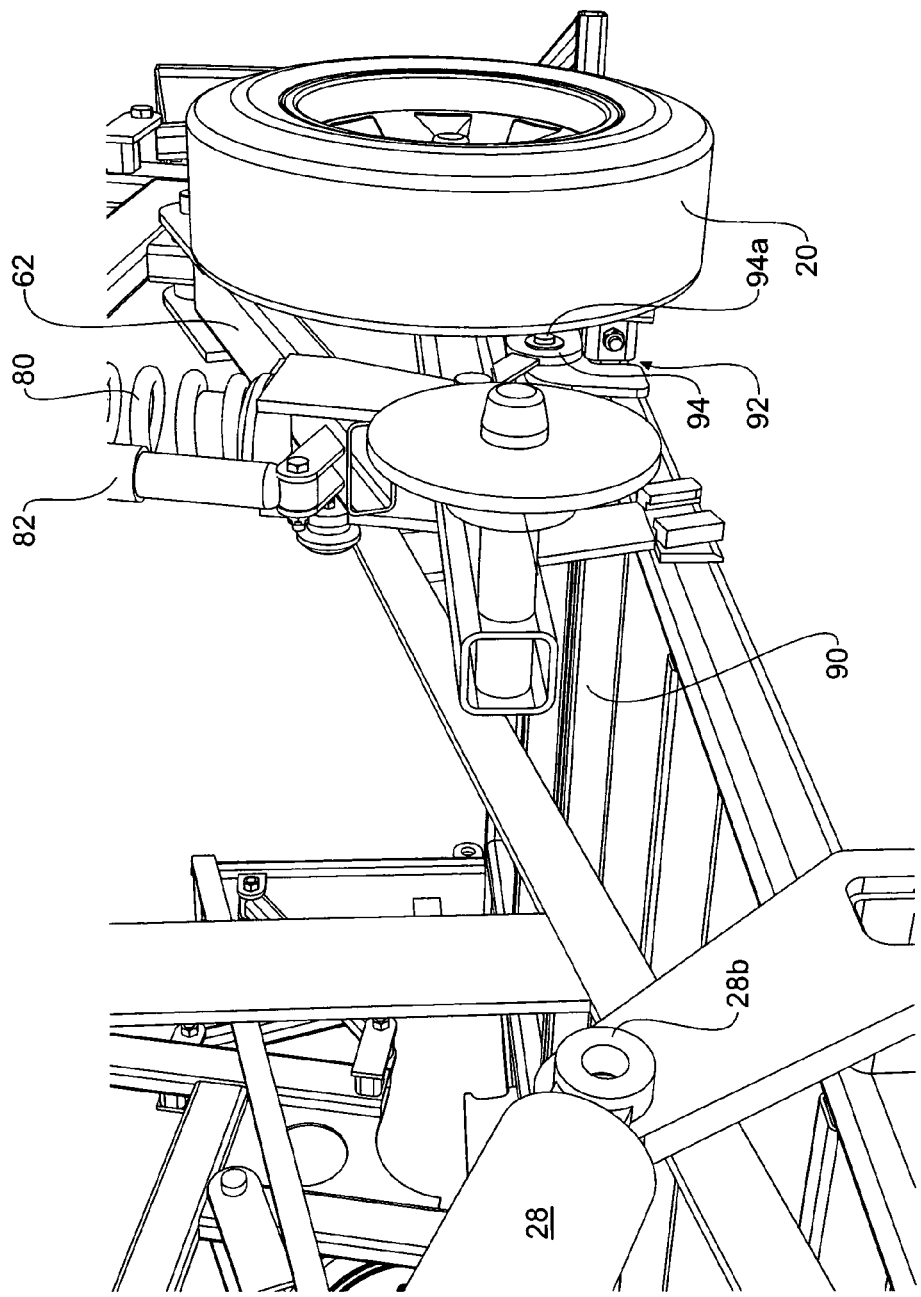
FIG. 15 is a detail view of one bogie and its associated raise and lower means when lowered to the ground, where one wheel has been removed for visibility.
Figure 16:
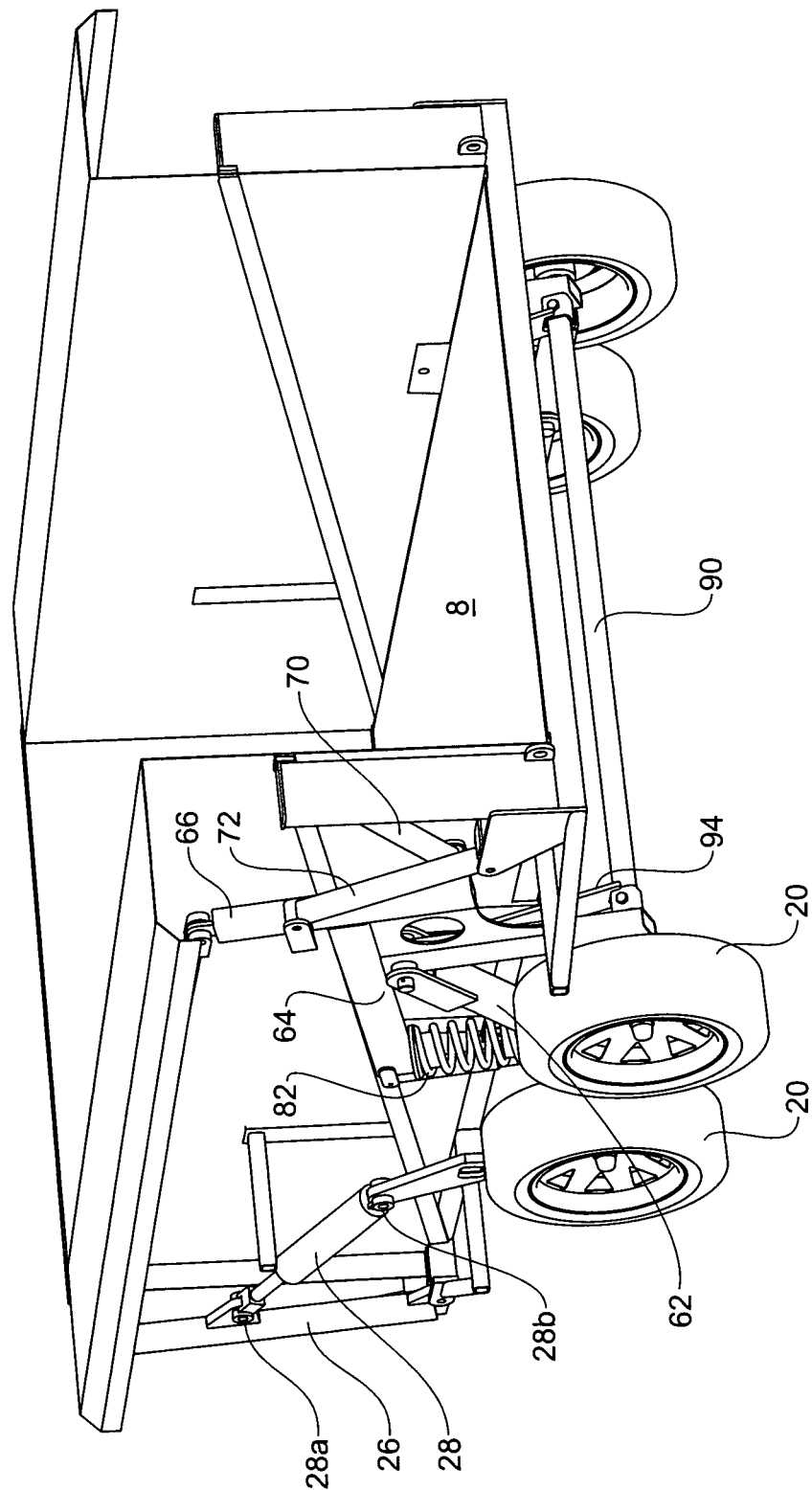
FIG. 16 is detail view of one bogie and its associated raise and lower means when raised above its ride height.
Figure 17:
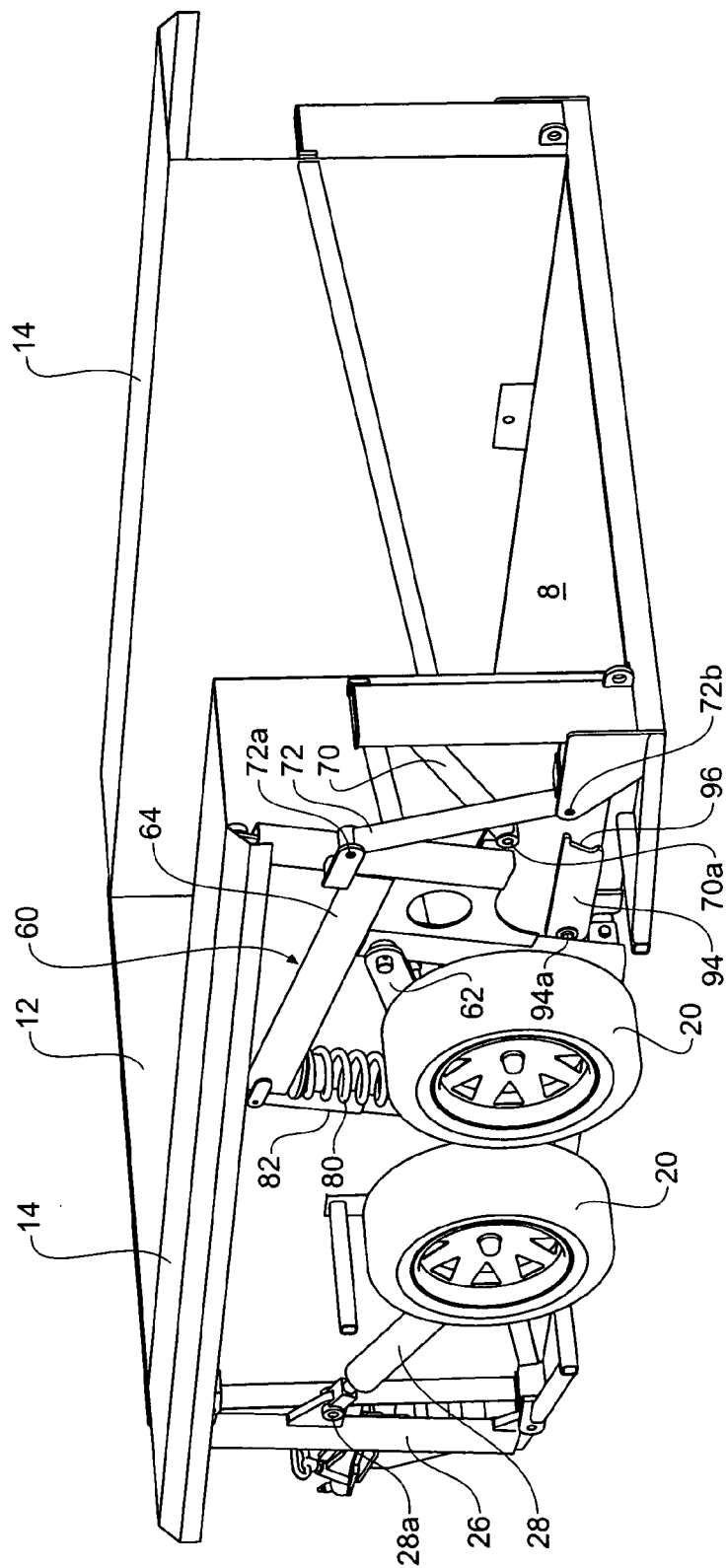
FIG. 17 is a detail view of one bogie and its associated raise and lower means when lowered to the ground.

Referring now to FIGS. 1 through 17, where an exemplary embodiment of a trailer 1 is illustrated, the trailer 1 comprises a body 2 and a pair of wheel bogies 4, there being a bogie 4 located on either side of the body 2.

In FIGS. 1 through 4, the body 2 of trailer 1 is supported at a ride height relative to its wheel bogies 4, where this ride height is the optimal height of the body 2 relative to its bogies 4 for the towing of the trailer 1. The trailer 1 further comprises means 6 (see FIG. 13) adapted to selectively raise and lower the body 2 relative to its ride height, said means 6 being located either side of the body 2 and securely linking the body 2 and bogie 4 on each side.

The body 2 defines a generally box shaped cargo area having a rectangular floor 8, a pair of side walls 10, a front end wall 12, and a tailgate (not shown) at a rear end thereof, although the invention applies equally to other trailer configurations. A pair of wings 14 extends outwardly from the side walls providing thereby mudguards for the wheels 20. Illustrated is a trailer 1 having a floor 8 which is 8'×5' (although the arrangement is not limited to this size) and which is suitable for numerous applications including (but not limited to) use by builders, farmers or as a camper trailer.

Beneath the floor 8 of the body 2 there is a supporting framework 16 which gives strength and rigidity to the body 2 of the trailer 1.

At the forward end of the trailer there is a drawbar 18 which is pivotally connected at point 18a to the supporting framework 16 of the body 2. In this embodiment the drawbar 18 extends at least approximately 1.5 m forward of the body 2 of the trailer 1, this distance being sufficient to provide clearance to permit the upward and downward movement of the body 2 of the trailer 1.

The drawbar 18 comprises an A-frame 22 defining an apex at the forward end thereof, at which there is located the trailer hitch (or coupling) 24. Whilst the trailer hitch 24 illustrated is a conventional one, the trailer hitch may be one adapted to provide height adjustment (such as via pin loaded telescoping portions etc.), where the height adjustment is built into either of the hitch 24 on the trailer or the vehicle ball mount for the hitch. A pair of uprights 26 extend from the rearward end of the drawbar 18 at spaced apart locations near to the trailer body 2.

Part way up the drawbar upright 26 is a pivotal mounting point 28a for an end of a linear actuator 28 (a hydraulic ram in this case). The distal end of this ram 28b is pivotally connected to a mounting point 30 extending from the supporting frame 16 of the trailer body.

At the uppermost end of the drawbar upright 26 there is a pivotal mounting point 32a for an end of a primary linkage 32. Primary linkage 32 is a component of the means 6 adapted to selectively raise and lower the body 2 relative to its ride height.

Each bogie 4 comprises a pair of spaced apart wheels 20 carried by a swing arm 50.

Pivotally connected to the swing arm 50 at a point midway between the wheels 20 is a cranked bogie arm 60.

The cranked bogie arm 60 comprises a first portion 62 which extends upward from the swing arm 50, and a generally 'T' shaped second portion 64 which extends transversely (generally rearwardly) from the first portion 62 and which terminates at a head portion 66 that is generally parallel to the first portion 62.

A first end of the head portion 66 is pivotally connected at point 32b to a second end of the primary linkage 32.

A second end of the head portion 66 is pivotally connected at point 70a to a first end of a first stabilising linkage 70, where a second end of the first stabilising linkage is pivotally connected to the trailer body 2 at point 70b.

A second stabilising element 72 has a first end pivotally connected to a medial portion of the head 66 of the bogie arm 60 at point 72a. The second end of this second stabilising element 72 is pivotally connected to the trailer body 2 at a point 72b positioned below that where the second end of the first stabilising linkage 70 is pivotally connected to the trailer body 2. As a result, the stabilising elements 70, 72, extend in separate, parallel planes, and cross over one another. Stabilising elements 70, 72 work in combination to kinematically restrain the movement of bogie arm 60, to tether this to the body 2 of the trailer 1, and ensure that the bogies 4 remain in a stability providing position beneath the body 2 throughout the it's range of movement.

The cranked bogie arm 60 incorporates trailer suspension. The first portion 62 of the cranked bogie arm 60 incorporates suspension elements in the form of a coil spring 80 and shock absorber 82 combination. Alternatively, a 'bag' of a hydro pneumatic (i.e. air) suspension system may be employed in place of the coil spring and shock absorber combination.

In order to accommodate the coil spring 80 and shock absorber 82 combination, the first portion 62 of the bogie arm 60 is a linkage which, in conjunction with the coil spring 80 and shock absorber 82, connect the first portion 62 of the bogie arm 60 to the second portion 64.

In this way, some sufficient suspension travel is permitted in the form of bogie arm 60 flexure, where this flexure can be dampened by the shock absorber.

When the body 2 of the trailer 1 is at its ride height, each of the drawbar 18, the primary linkage 32 and the second portion 64 of the bogie arm 60 are substantially parallel to the ground. Moreover, a locking means (discussed in further detail below) may be engaged to prevent the bogie 20 from floating laterally relative to the body 2 of the trailer 1.

In use, the body 2 of the trailer 1 can be lowered from its ride height to the ground (as illustrated in FIGS. 9 through 12) by permitting the hydraulic ram 28 to retract. This causes the drawbar 18 to pivot upwardly, forcing each primary linkage 32 rearward, and each bogie arm 60 to pivot rearwardly so that the second portion 64 of each bogie arm 60 has a combined rearward and downward inclination. The result is that the body 2 of the trailer 1 is both lowered and rearwardly displaced relative to the bogies 4, whilst remaining substantially parallel to the ground throughout its travel and without need to disconnect the trailer from the tow vehicle.

The ability to lower the body 2 of the trailer 1 to the ground is advantageous when loading and unloading various types of loads, such as heavy wheeled objects for instance.

The body 2 of the trailer 1 is raised (as illustrated in FIGS. 5 through 8) by extending the hydraulic ram 28, where this causes the drawbar 18 to pivot downwardly, forcing each primary linkage 32 forward, and each bogie arm 60 to pivot forwardly as the body 2 is raised past the ride height (as illustrated in FIGS. 5 through 8) so that the second portion 64 of the bogie arm 60 has a combined upward and rearward inclination. The result that the body 4 of the trailer 1 is both raised and forwardly displaced relative to the bogies 4.

The ability to raise the body 2 of the trailer 1 above the ride height thereof is advantageous where the trailer 1 is to be used with an elevated platform such as a loading dock. Conceivably, the body 2 of the trailer 1 could also be raised to permit the trailer 1 to traverse uneven ground surfaces impassable by a conventional trailer.

A cross beam 90 extends between the two wheel assemblies 4 so as to link these and prevent any lateral wandering of the same under tow, and ensure that the raise and lower means 6 of the two wheel assemblies work in unison when raising or lowering the trailer body 2. This cross beam 90 is a length of square hollow section steel connected at each end to a respective lowermost end of a first portion 62 of the cranked bogie arm 60. The cross beam 90 travels in a generally elliptical path as the trailer body 2 is raised and lowered, so that when the trailer body 2 is at ride height, the cross beam 90 is retained at such a height relative to the ground as to give good and legal ground clearance.

When the body 2 of the trailer 1 is lowered to the ground, this cross beam 90 locates in a recess 92 which extends across the trailer. This recess 92 is required because the cross beam 90 sits on the ground when the body 2 of the trailer 1 is lowered to the ground.

There is a travel height chock linkage 94 positioned on each side of the body 2 which pivots about pivotal attachment point 94a for the same. Each travel height chock linkage 94 is weighted so as to swing into an approximately vertical position by default, in which vertical position a notched end 96 of each is lowermost and locates on top of the square cross beam 90, thereby preventing unwanted lowering of the trailer body 2, such as when under tow.

The travel height chock linkages 94 are disengaged by raising the trailer body 2 until the travel height chock linkages 94 can be swung into an approximately horizontal position and out of the way by means of a linkage (such as a cable linkage—not illustrated) which connects both travel height chock linkages 94 to an actuator lever located (not illustrated) at or near the forward end of the trailer 1. The trailer body 2 can then be lowered below ride height and to the ground if needed. When the trailer body 2 is raised past ride height, the travel height chock linkages 94 will automatically (due to their weighting about pivot point 94a) swing into place (see FIG. 16). The trailer body 2 can then be lowered to ride height and the travel height chock linkages 94 located onto the cross axle 90 once again.

A releasable locking pin 100 is retained relative to the supporting framework 16 of the trailer 1 at mounting point 102. The locking pin 100 registers in a receiving aperture in the lowermost clevis of the first portion 62 of the bogie arm 60 when the trailer body 2 is at ride height. When engaged, locking pin 100 confines any movement in the raise and lower means 6 to the suspension, where this is absorbed via the spring 80 and shock absorber 82, so that the trailer 1 is as rigid as a regular trailer under tow.

An advantage of the above described linkage arrangement 6 is that it provides a high degree of mechanical advantage to the linear actuator 28. As a consequence, only a relatively small linear actuator 28 is required. This reduces the size of hydraulic pump (not illustrated) required, and the overall expense of the hydraulics required in turn.

It will be understood that the term "comprise" and any of its derivatives (e.g. comprises, comprising) as used in this specification is to be taken to be inclusive of features to which it refers, and is not meant to exclude the presence of any additional features unless otherwise stated or implied.

The reference to any prior art in this specification is not, and should not be taken as, an acknowledgement of any form of suggestion that such prior art forms part of the common general knowledge.

Although an illustrative embodiment of the present invention has been described in the foregoing detailed description, it will be understood that the invention is not limited to the embodiment disclosed, but is capable of numerous rearrangements, modifications and substitutions without departing from the scope of the invention as set forth and defined by the following claims.

The invention claimed is:

1. A trailer comprising a body, a drawbar pivotally connected to the body at a forward end thereof and comprising a pair of spaced apart uprights, one upright at or toward each of a pair of sides of the body, a linear actuator extending between the trailer body and a drawbar upright, a wheel assembly on each side of the trailer body, where for each wheel assembly there is a primary linkage extending between the drawbar upright and the wheel assembly of a same side of the trailer body, and a stabilizing linkage extending between the trailer body and the wheel assembly, and a linear actuator driving means operable to selectively raise and lower the body relative to its wheel assemblies whilst keeping the body substantially parallel to the ground throughout its range of movement.

2. The trailer of claim 1, wherein the linear actuator driving means is operable to lower the body of the trailer to the surface upon which the trailer sits, and raise the body from this position.

3. The trailer of claim 1, wherein each wheel assembly comprises a bogie, and a bogie arm to which the bogie, primary linkage and stabilizing linkage are pivotally connected.

4. The trailer as in claim 3, wherein each stabilizing linkage extends between the trailer body upright and the wheel assembly of the same side of the trailer body.

5. The trailer as in claim 3, wherein each bogie arm is driven to rotate in a forward direction to raise the trailer body relative to the wheel assemblies, and in a rearward direction to lower the trailer body relative to the wheel assemblies.

6. The trailer of claim 1, wherein each wheel assembly comprises suspension.

7. The trailer of claim 6, wherein the stabilizing linkage comprises a pair of crossing linkages.

8. The trailer of claim 1, wherein there is a linear actuator at or toward either side of the trailer body, each extending between the drawbar upright and a same side of the trailer body.

9. The trailer of claim 1, wherein the trailer body comprises a pair of spaced apart uprights at or toward a rear end thereof, one each at or toward either side of the trailer body.

10. The trailer as in claim 1, further comprising means for releasably securing the trailer body at a ride height relative to the wheel assemblies.

11. The trailer as in claim 1, further comprising a cross beam extending between the two wheel assemblies so as to link these and prevent any lateral wandering of the same under tow, and ensure that these work in unison when raising or lowering the trailer body.

* * * * *